UNITED STATES PATENT OFFICE.

WILLIAM B. OTWELL, OF CARLINVILLE, ILLINOIS.

COMPOSITION FOR PROTECTING TREES.

SPECIFICATION forming part of Letters Patent No. 583,311, dated May 25, 1897.

Application filed January 27, 1897. Serial No. 620,954. (No specimens.)

*To all whom it may concern:*

Be it known that I, WILLIAM B. OTWELL, a citizen of the United States, residing at the city of Carlinville, in the county of Macoupin and State of Illinois, have invented a certain new and useful Paint for Fruit-Trees, of which the following is such a full, clear, and exact description as will enable any one skilled in the art to which it appertains to make and use the same.

The object of my invention is to produce a paint for fruit-trees which will protect the trees from insects and animals, will tend to cure wounds and bruises on the trees, and will act as a fertilizer when washed down by rains or in any other manner.

In compounding my paint I proceed as follows: I first mix together one gallon of lime about the consistency of putty, one ounce of sulfur, one quart of flour, and one ounce sulfate of copper. After these have been thoroughly mixed I add two gallons of water and stir until the mixture is about the consistency of ready-mixed paint. To this mixture I now add one-half ounce each of ordinary commercial concentrated lye and carbonate of soda, again thoroughly stirring the mixture. I now prepare a dry mixture consisting of four and one-half pints Venetian red, three ounces powdered gum-arabic, one-half ounce powdered borax, and one ounce powdered alum. This after being thoroughly mixed is added to the preceding mixture and the whole stirred. The paint is now completed by adding to the resulting mixture one pint of crude carbolic acid and again stirring. In preparing the dry mixture the borax may be omitted without materially affecting the paint. I prefer to use it, however.

In preparing the paint care should be taken to proceed in the manner specified, as the desired results cannot be obtained unless the ingredients are properly mixed.

My paint may be applied with a brush or in any other suitable way.

My paint protects the trees from rabbits, mice, borers, grasshoppers, locusts, and aphis and prevents sun-scald. Besides this it acts as a fertilizer when washed down around the roots of the trees.

Having fully described my invention, what I claim as new, and desire to secure by Letters Patent of the United States, is—

1. A paint for fruit-trees consisting of lime, sulfur, flour, sulfate of copper, water, lye, carbonate of soda, Venetian red, gum-arabic, alum and carbolic acid in about the proportions specified.

2. A paint for fruit-trees consisting of lime, sulfur, flour, sulfate of copper, water, lye, carbonate of soda, Venetian red, gum-arabic, borax, alum and carbolic acid in about the proportions specified.

In testimony whereof I have hereunto set my hand and affixed my seal in the presence of the two subscribing witnesses.

WILLIAM B. OTWELL. [L. S.]

Witnesses:
 H. L. HOBLIT,
 FRANK HOBLIT.